United States Patent [19]

Sogabe et al.

[11] 4,004,828

[45] Jan. 25, 1977

[54] VEHICLE SAFETY DEVICE USING AN INFLATABLE CONFINEMENT AND METHOD OF FOLDING THE INFLATABLE CONFINEMENT

[75] Inventors: Yoji Sogabe; Tetsuo Edamatsu, both of Ashikaga; Takashi Oka, Tokyo, all of Japan

[73] Assignees: Nissan Motor Co., Ltd., Yokohama; Kohkoku Chemical Industry Co., Ltd., Tokyo, both of Japan

[22] Filed: Aug. 19, 1975

[21] Appl. No.: 605,807

[30] Foreign Application Priority Data

Aug. 19, 1974 Japan .............................. 49-94866

[52] U.S. Cl. ................................................ 280/743
[51] Int. Cl.² ........................................ B60R 21/08
[58] Field of Search .......... 280/150 AB, 87 R, 743, 280/728, 729, 730, 731, 732, 733; 9/316; 270/61 R; 244/31

[56] References Cited

UNITED STATES PATENTS

| | | | |
|---|---|---|---|
| 2,993,217 | 7/1961 | Switlik | 9/316 |
| 3,532,359 | 10/1970 | Teague et al. | 280/150 AB |
| 3,706,462 | 12/1972 | Lilly | 280/150 AB |
| 3,736,004 | 5/1973 | Haruna | 280/150 AB |
| 3,768,824 | 10/1973 | Kloppe et al. | 280/87 R |
| 3,787,075 | 1/1974 | Francis | 280/150 AB |

*Primary Examiner*—Kenneth H. Betts

[57] ABSTRACT

A confinement is composed, in its collapsed stored condition, two diametrically opposed double-layer portions folded to meet each other and another two opposed double-layer portions folded to cover at least in part the first two portions. The folded confinement is placed in its receptacle.

11 Claims, 5 Drawing Figures

VEHICLE SAFETY DEVICE USING AN INFLATABLE CONFINEMENT AND METHOD OF FOLDING THE INFLATABLE CONFINEMENT

The present invention relates in general to automotive safety devices and refers to a vehicle safety device of the type which uses an inflatable confinement or protector bag having a folded or collapsed inoperative condition and an expanded protective condition. When held inoperative, the inflatable confinement in the folded or collapsed condition is stowed in a receptacle which is located within or mounted on the instrument panel or the steering column of the vehicle or, if the safety device is intended to protect an occupant of the rear seat, carried on the back of the front seat of the vehicle together with a source of gas under pressure. In the event the vehicle encounters a collision, particularly, a head-on collision during cruising and the impact is transferred to the safety device from the vehicle body, the source of the gas under pressure is actuated to instantaneously expand and move the inflatable confinement into a protective position intervening between a vehicle occupant and a structural part of the vehicle such as for example the windshield, the instrument panel or the steering wheel. The vehicle occupant being flung forward is thus caught by the expanded confinement and is restrained from being further moved forward.

Among the most important design considerations of the inflatable confinement of this nature is the arrangement to have the folded or collapsed confinement stored in the receptacle snugly and compactly and which will nevertheless enable the confinement to be instantaneously expanded and moved into the protective position when the source of the gas under pressure is actuated and the confinement is blown up with the pressurized gas at an incipient stage of the collision condition.

It is, therefore, an object of the present invention to provide a vehicle safety device having an inflatable confinement snugly and compactly stored in a folded condition within a receptacle.

It is another object of the present invention to provide a method of snugly and compactly disposing an inflatable confinement in a folded condition within a receptacle.

In accordance with one aspect of the present invention, there is provided a vehicle safety device including an inflatable confinement which comprises substantially congruent two layers joined together along their edges and having a gas inlet opening formed in one layer and located in registry with a center portion of the other layer and which has a folded inoperative condition stored in a receptacle and an expanded protective condition moved out of the receptacle, the inflatable confinement in the folded inoperative condition having a generally rectangular configuration having a first pair of diametrically opposed double-layer portions which are folded over to form respective creases substantially parallel with each other across the center portion and which have respective free ends at least in part meeting each other on the center portion, and a second pair of diametrically opposed double-layer portions which are folded over to form respective creases substantially perpendicular to the creases formed by the first pair of opposed double-layer portions and which are at least in part superimposed on the first pair of opposed double-layer portions with their respective free ends located on the outer face of the center portion. If desired, the inflatable confinement with the above described configuration may have its four-layer individual corner portions folded over at least once to have the respective vertices of the corner portions located in close proximity to each other over the center portion.

In accordance with another aspect of the present invention, there is provided a method of disposing within a receptacle of an automotive safety device of the described character an inflatable confinement having substantially congruent two layers joined together along their edges and having a gas inlet opening formed in one layer and located in registry with a center portion of the other layer, the method comprising the steps of (i) spreading the two layers substantially flatwise with the above mentioned center portion located over the gas inlet opening, (ii) folding over a first pair of diametrically opposed double-layer portions of the confinement along respective lines substantially parallel with each other across the center portion so that the free ends of the portions at least in part meet each other on the front side center portion, (iii) folding over a second pair of diametrically opposed double-layer portions along respective lines substantially perpendicular to the first named lines so that the second pair of opposed double-layer portions are at least in part superimposed on the first pair of opposed double-layer portions and have respective free ends at least in part meeting each other over the center portion, the confinement now having a generally rectangular configuration having four four layer corner portions, and (iv) positioning the thus folded inflatable confinement within the aforesaid receptacle. If desired, the method may further comprise at least one step of folding back the above mentioned corner portions so that the respective vertices of the corner portions are located in close proximity to each other over the aforesaid center portion.

The nature of the vehicle safety device and the method according to the present invention will become more apparent from the following description taken in conjunction with the accompanying drawings, in which.

Figure 1:
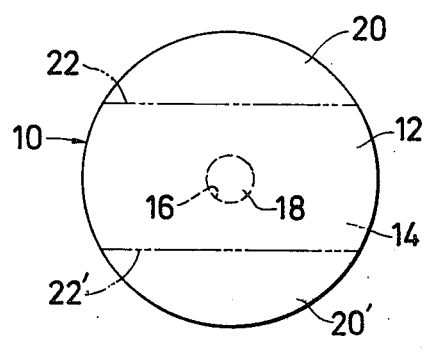
FIG. 1 is a plan view of an inflatable confinement to be folded and stowed in accordance with the present invention.

Referring to the drawings, first to FIG. 1, an inflatable confinement 10 to which the present invention appertains is shown to have a generally circular configuration consisting essentially of subtantially congruent front and rear layers 12 and 14 which are joined together along their edges. As will be described in more detail, the inflatable confinement 10 is arranged in a manner to move rearwardly of the vehicle cabin toward a front part of a vehicle occupant so that the front layer 12 is brought into contact with the vehicle occupant when the inflatable confinement safety device is expanded. The terms "front" and "rear" herein used in connection with the inflatable confinement 10 are, thus, converse to those which are usually employed in respect of the positions relative to the vehicle body.

Figure 2:
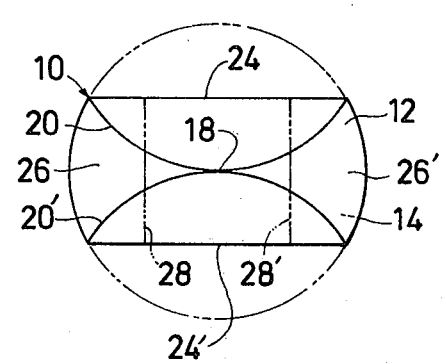
FIG. 2 is a plan view showing a condition in which the inflatable confinement shown in FIG. 1 is partly folded.
Figure 3:
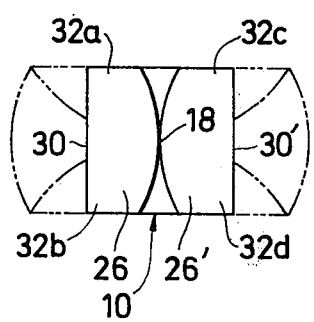
FIG. 3 is a plan view showing a condition in which the inflatable confinement partly folded as shown in FIG. 2 is further partly folded.
Figure 4:
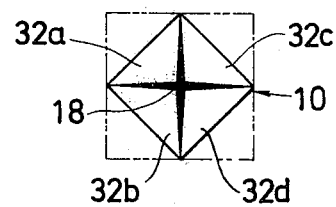
FIG. 4 is a plan view showing a condition in which the inflatable confinement which has been folded as shown in FIG. 3 is further folded.
Figure 5:
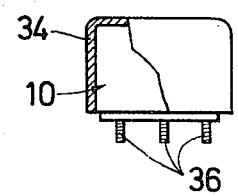
FIG. 5 is a partially cut-away side elevation view which shows an arrangement in which the inflatable confinement folded as illustrated in FIG. 4 is stored within a receptacle of an automotive safety device of the described character.

The inflatable confinement 10 has a gas inlet opening 16 formed in the rear layer 14. the gas inlet opening 16 is located substantially centrally of the rear layer so that, when the inflatable confinement 10 is spread flat, the gas inlet opening 16 is located substantially in registry with a center portion 18 of the front layer 12 as shown. A first pair of diametrically opposed double-layer portions 20 and 20' are folded over along lines 22 and 22', respectively, which are substantially parallel with each other across the center portion 18 of the front layer 12 so that the curved free ends of the opposed double-layer portions 20 and 20' meet each other at their tops on the outer face of the center portion 18 of the front layer 12. As is seen in FIG. 2 the inflatable confinement 10 thus folded has a pair of creases 24 and 24' which have resulted from the lines 22 and 22' shown in FIG. 1 and which are thus substantially parallel with each other across the center portion 18. A second pair of diametrically opposed double-layer portions 26 and 26' of the inflatable confinement 10 thus folded primarily are then folded over along parallel lines 28 and 28', respectively, which are spaced apart from each other across the center portion 18 of the front layer 12 and which are substantially perpendicular to the above mentioned creases 24 and 24' formed by the primarily folded portions 20 and 20'. The second pair of opposed double-layer portions 26 and 26' are thus superimposed on part of the previously folded portions 20 and 20' with the curved ends of the portions 26 and 26' meeting each other at their tops over the outer face of the center portion 18 of the initial front layer 12 of the confinement 10. As is seen in FIG. 3, the inflatable confinement 10 thus folded secondarily has a pair of creases 30 and 30' which have resulted from folds along the lines 28 and 28' shown in FIG. 2 and which are therefore substantially perpendicular to the creases 24 and 24' formed by the primarily folded portions 20 and 20'. The inflatable confinement 10 now has a generally square-shaped configuration having four four-layer corner portions 32a, 32b, 32c, and 32d. The inflatable confinement 10 thus folded may be installed in a working position as it is but, in the present invention, it is preferable that the inflatable confinement 10 is made more compact by folding over the individual corner portions 32a, 32b, 32c and 32d so that the respective vertices of the corner portions are located in close proximity to each other over the center portion 18 of the initial front layer 12 as illustrated in FIG. 4. If desired, the inflatable confinement 10 thus folded into a generally square-shaped configuration illustrated in FIG. 4 may be further folded in a similar manner until the external shape of the folded confinement 10 conforms to the geometry of the space in the receptacle (designated by reference numeral 34 in FIG. 5) within which the inflatable confinement 10 in the folded condition is to be accommodated. The inflatable confinement 10 which has been finally folded is fitted to the receptacle 34 by suitable fastening means such as a plurality of screws 36 in such a manner that the folded inflatable confinement 10 is snugly housed within the receptacle 36 as shown in FIG. 5 and that the gas inlet opening 16 formed in the rear layer 14 of the confinement 10 is in communication with an outlet of a normally closed or otherwise inoperative source (not shown) of gas under pressure. When the source of gas under pressure is opened or otherwise activated in response to a collision encountered by the vehicle, the inflatable confinement 10 which has been stored in the above described folded condition within the receptacle 34 is expanded by the pressurized gas admitted into the confinement 10 through the gas inlet opening 16 and is moved out of the receptacle 34 in an expanded condition. The expanded confinement 10 is moved toward the occupant of the vehicle and captures the front part of the occupant by the front layer 12 thereof and thus intervenes between the occupant and a structural part of the vehicle with its rear layer 14 forced against the structural part. The vehicle occupant is in this manner restrained from being flung forward and is protected from injury. In this instance, it will be understood that the inflatable confinement 10 is smoothly and rapidly expanded to its full capacity as the confinement is moved toward the vehicle occupant because of the fact that the confinement 10 in the stored condition is folded substantially symmetrically with respect to lines passing through the center of the gas inlet opening 16 in the rear layer 14 of the confinement. Because, furthermore, the inflatable confinement 10 is folded substantially symmetrically with respect to the lines passing through the center portion of the front layer thereof when stored within the receptacle 34, the confinement 10 can be snugly and compactly accommodated in the receptacle 34 so that the receptacle 34 can be significantly small-sized.

The inflatable confinement has been assumed to have a generally circular shape when spread flat but it should be borne in mind that the arrangement and the method according to the present invention are applicable to an inflatable confinement having any other configuration which may not be symmetric with respect to the center of the gas inlet opening or to a line or lines passing through the center of the gas inlet opening.

What is claimed is:

1. A safety device including an inflatable confinement which comprises substantially congruent two layers joined together along their entire edges and having a gas inlet opening formed in one layer and located in registry with a central portion of the other layer and which has a folded inoperative condition stored in a receptacle and an expanded protective condition moved out of the receptacle, the inflatable confinement in said folded inoperative condition having a generally rectangular configuration having first two diametrically opposed double-layer portions which are folded over to form respective creases substantially parallel with each other across said center portion and which have respective free ends at least in part meeting each other on said center portion, and second two diametrically opposed double-layer portions which are folded over to form respective creases substantially perpendicular to said creases formed by said first two opposed double-layer portions and which are at least in part superimposed on the first two opposed double-layer portions with the respective free ends thereof located at least in part on the outer face of said center portion.

2. A safety device according to claim 1, in which said inflatable confinement with said generally rectangular configuration has its four four-layer portions which are folded over at least once to have the respective vertices of the corner portions located in close proximity to each other over said center portion.

3. A safety device according to claim 1, in which said first two diametrically opposed double-layer portions are substantially symmetrical with respect to a line passing through the center of said gas inlet opening and substantially parallel with said creases formed by the first two opposed double-layer portions.

4. A safety device according to claim 1, in which said second two diametrically opposed double-layer portions are substantially symmetrical with respect to a line passing through the center of said gas inlet opening and substantially parallel with said creases formed by the second two opposed double-layer portions.

5. A safety device according to claim 1, in which said first two diametrically opposed double-layer portions are substantially symmetrical with respect to a line passing through the center of said gas inlet opening and substantially parallel with said creases formed by the first two opposed double-layer portions and said second two diametrically opposed double-layer portions are substantially symmetrical with respect to a line passing through the center of said gas inlet opening and substantially perpendicular to the first named line.

6. A safety device according to claim 5, in which said inflatable confinement is substantially symmetrical with respect to the center of said gas inlet opening when spread flat.

7. A method of folding and disposing within a receptacle of a safety device of the described character an inflatable confinement comprising substantially congruent two layers joined together along their entire edges and having a gas inlet opening formed in one layer and located in registry with a central portion of the other layer, comprising the steps of (i) spreading the two layers substantially flat with said center portion located substantially in registry with said gas inlet opening, (ii) folding over first two diametrically opposed double-layer portions of the inflatable confinement along respective lines substantially parallel with each other across said center portion so that the free ends of the folded opposed portions at least in part meet each other on the outer face of said center portion, (iii) folding over second two diametrically opposed double-layer portions of the inflatable confinement along respective lines substantially perpendicular to the first named lines so that the second two opposed double-layer portions are at least in part superimposed on said first two opposed double-layer portions and have respective free ends at least in part meeting each other over said center portion, and (iv) positioning the thus folded inflatable confinement within said receptacle.

8. A method according to claim 7, further comprising at least one further step of folding over the inflatable confinement in such a manner that the four four-layer corner portions of the confinement with said generally rectangular configuration are folded over at least once so as to have the respective vertices of the corner portions located in close proximity to each other over said front portions.

9. A method according to claim 7, in which said first two diametrically opposed double-layer portions are substantially symmetrical with respect to a line passing through the center of said gas inlet opening and substantially parallel with said lines along which said first two opposed double-layer portions are folded.

10. A method according to claim 7, in which said second two diametrically opposed double-layer portions are substantially symmetrical with respect to a line passing through the center of said gas inlet opening and substantially parallel with said lines along which said second two opposed double-layer portions are folded.

11. A method according to claim 7, in which said first two diametrically opposed double-layer portions are substantially symmetrical with respect to a line passing through the center of said gas inlet port and substantially parallel with said lines along which said first two opposed double-layer portions are folded and said second two diametrically opposed portions are substantially symmetrical with respect to a line passing through the center of said gas inlet port and substantially perpendicular to said line with respect to which said first two opposed double-layer portions are symmetrical with each other.

* * * * *